Oct. 28, 1930.  A. L. THURSTON  1,779,718
COMBINED AEROPLANE WING AND RADIATOR SYSTEM
Original Filed Jan. 22, 1924   5 Sheets-Sheet 1
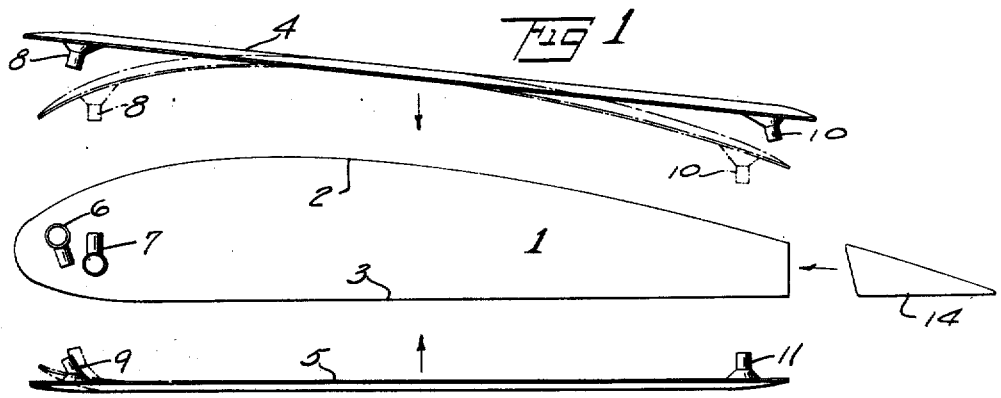
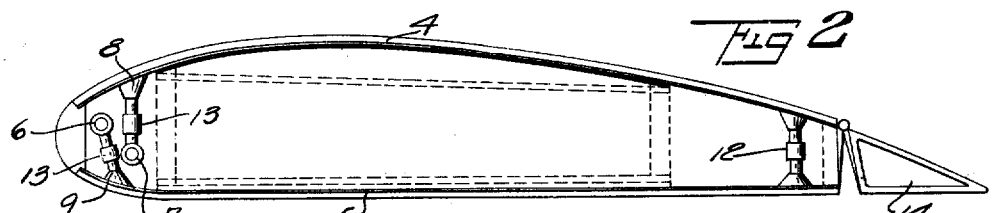
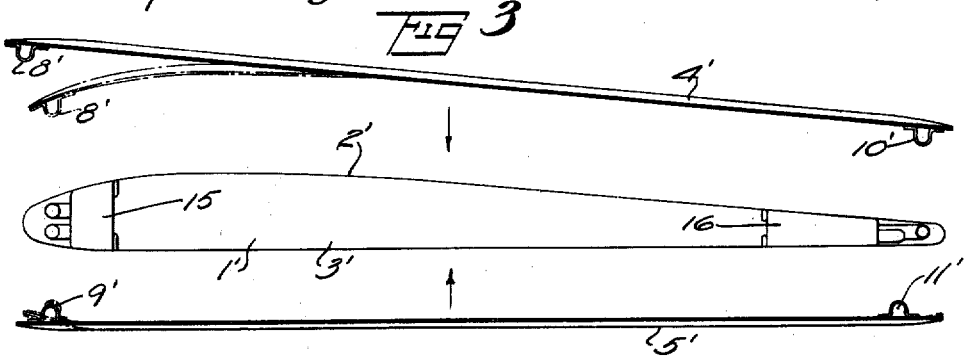
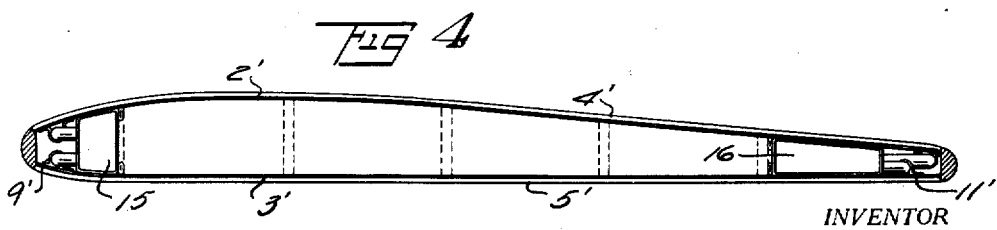
INVENTOR
Arthur L. Thurston
BY Chas. H. Keel
ATTORNEY Oct. 28, 1930. A. L. THURSTON 1,779,718
COMBINED AEROPLANE WING AND RADIATOR SYSTEM
Original Filed Jan. 22, 1924   5 Sheets-Sheet 2
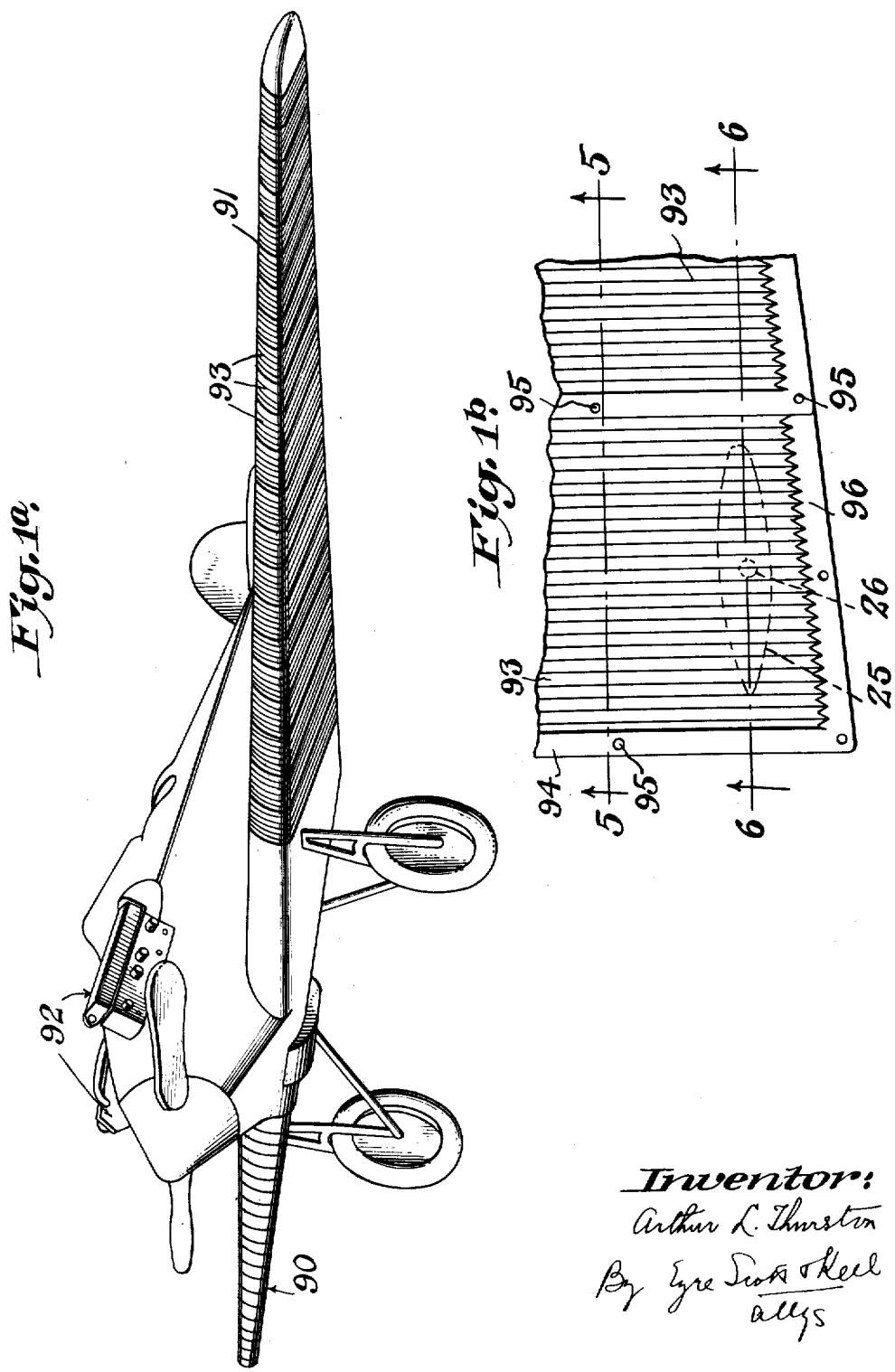
Inventor:
Arthur L. Thurston
By Eyre Scott & Keel
attys Oct. 28, 1930. A. L. THURSTON 1,779,718
COMBINED AEROPLANE WING AND RADIATOR SYSTEM
Original Filed Jan. 22, 1924 5 Sheets-Sheet 3
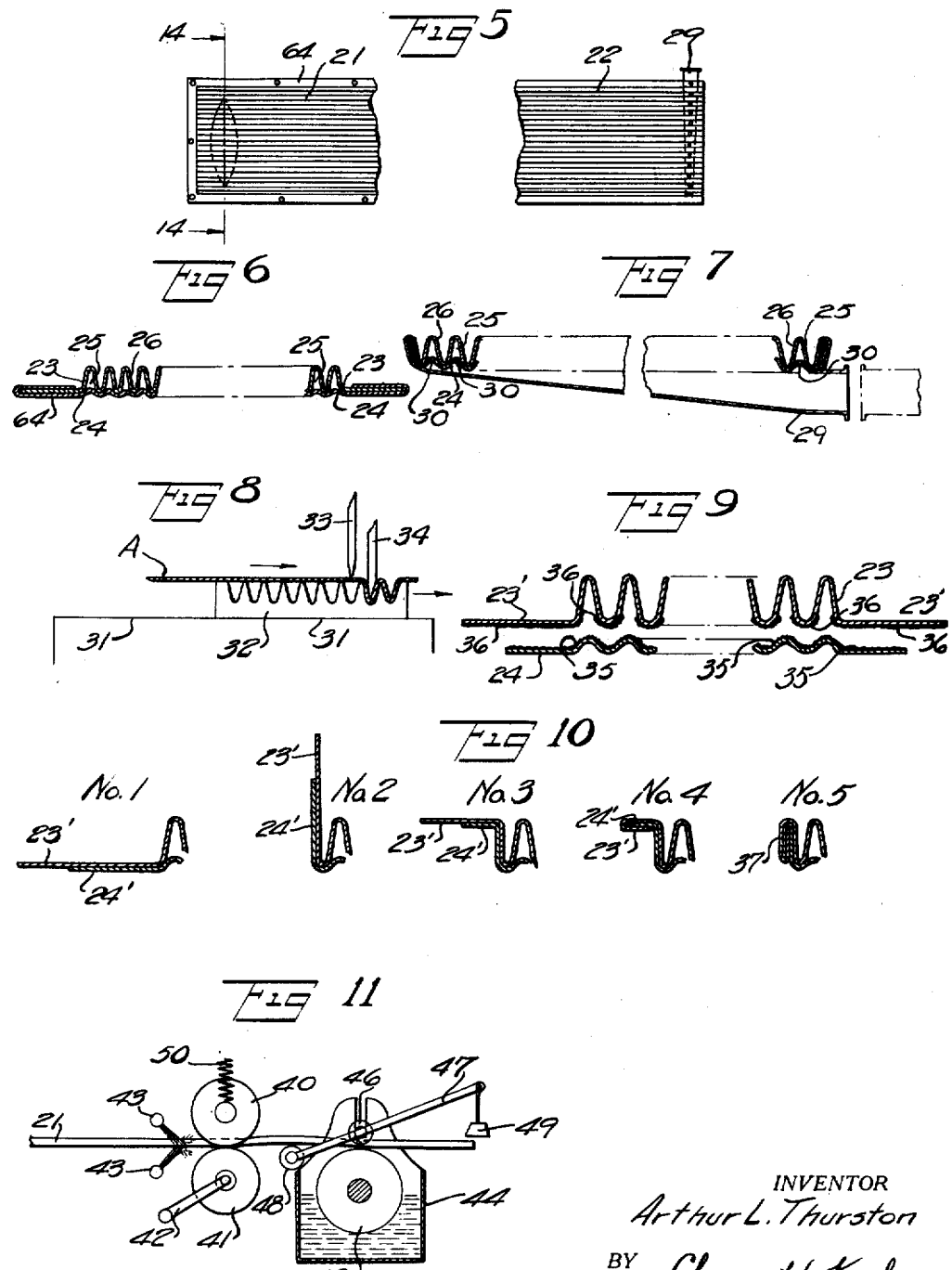
INVENTOR
Arthur L. Thurston
BY Chas. H. Keel
ATTORNEY

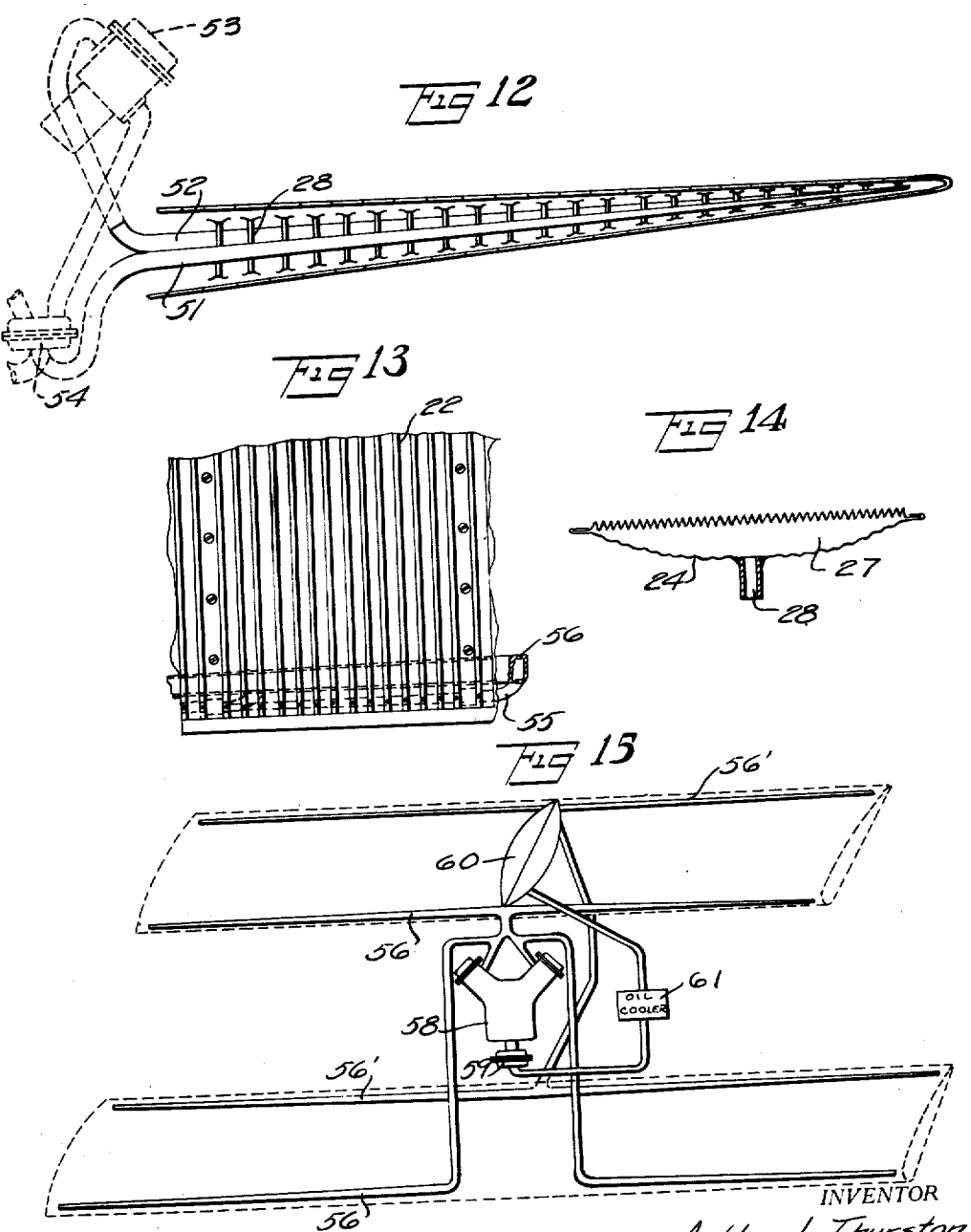

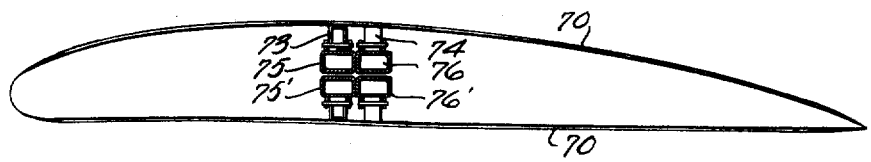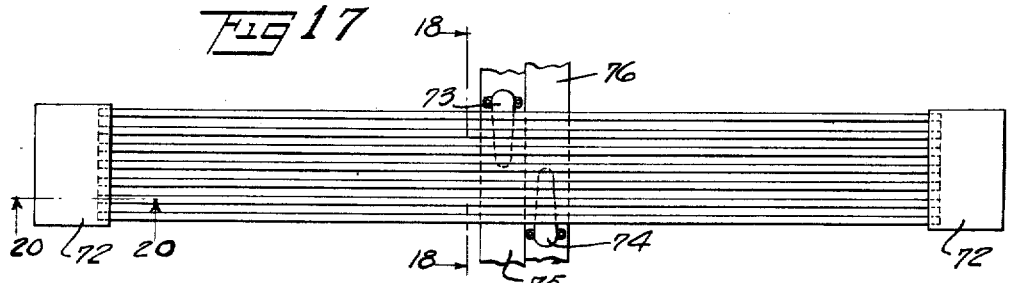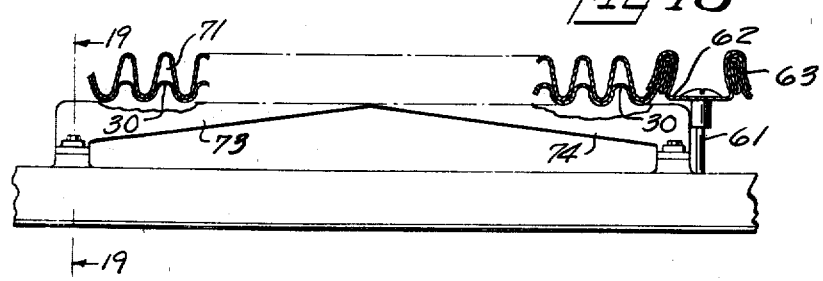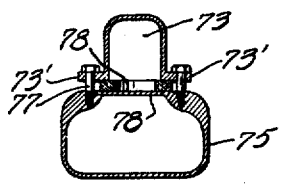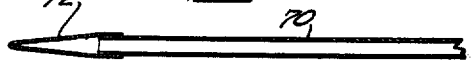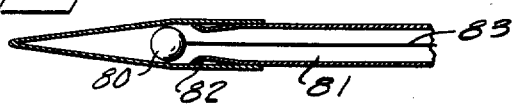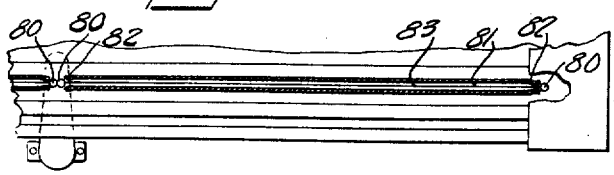

Patented Oct. 28, 1930

1,779,718

UNITED STATES PATENT OFFICE

ARTHUR L. THURSTON, OF FREEPORT, NEW YORK, ASSIGNOR TO CHARLES H. KEEL, TRUSTEE, OF NEW YORK, N. Y.

COMBINED AEROPLANE WING AND RADIATOR SYSTEM

Application filed January 22, 1924, Serial No. 687,848. Renewed April 22, 1929.

This invention relates to combined aeroplane wing and surface radiator structures, radiator elements, and radiator systems for aircraft.

This application is a continuation in part of my application Serial No. 651,195, filed July 13, 1923.

The object of the invention, generally, is a novel engine cooling system for aeroplanes comprising a combined aerofoil lifting and heat radiating surface and including an aeroplane wing having a plurality of readily disconnectable and replaceable shallow cooling fluid circulating and radiating units forming the lifting surface thereof. A further object is a radiator unit of this character and of a construction to effect the distribution of the cooling fluid into numerous attenuated streams or films, approximating a continuous sheet, exposed to a large radiating surface, and to resist puncture and have a self-sealing tendency against leakage due to injury from bullets in warfare and from similar causes. To these ends I have devised a radiating system comprising a plurality of interconnected cooperating units of the character indicated and of a construction to be readily assembled upon the wing framework to form a radiating and lifting surface of improved efficiency and to be economically and quickly repaired by either disconnecting and isolating the injured section or replacing it with an unimpaired one.

A further object of the invention is a novel wing-radiator construction and method of making, building up and assembling the same, particularly a wing having a surface radiator on either or both surfaces thereof whereby the wing frame and the radiator may be readily formed into a combined unit of substantially integral and accurately interfitting construction, enabling removal and replacement of the radiator on either surface without disassembly of the wing and whereby pronounced efficiency and reliability in the cooling of the power plant are obtained. To these ends I have devised a wing with a surface radiator forming its lifting surface, the latter being composed of flexible and readily adaptable sheet like radiator elements which may be correlated with and incorporated into the wing framework with marked facility and with equal readiness connected up with the circulatory circuit for efficient engine cooling with minimum parasitic resistance in the operation of the craft.

A further object of the invention is a novel wing surface radiator system and method of forming the same, comprising a multiplicity of radiator units correlated and assembled together in a novel manner to form efficient, reliable and easily repaired circulating circuits throughout a substantial portion of the wing surface, either on the under or upper surface or on both. A further object is a novel radiator unit and method of manufacturing the same whereby the thin metal of which the unit is constructed is unimpaired during its manufacture and retains its original strength and whereby a self-sealing tendency against puncture by bullets is obtained. A still further object is a novel method of manufacture whereby the radiator units may be economically produced and the integrity and reliability of their construction assured, notwithstanding the severe service conditions to which they are subjected.

For a better understanding of my invention, including the novel features above generally indicated and others which will hereinafter appear, reference may be had to the accompanying drawings forming a part of this application wherein:

Fig. 1 is a diagrammatic view illustrating the method of forming the combined wing and radiator;

Fig. 1ᵃ is a perspective view of an aeroplane embodying my invention;

Fig 1ᵇ is an enlarged plan view of one end of the radiator and surface construction;

Fig. 2 is a sectional view of the combined unit of Fig. 1 after completion;

Fig. 3 is a view similar to Fig. 1 showing a slightly modified combined unit;

Fig. 4 is a sectional view of the combined unit of Fig. 3 after completion;

Fig. 5 is a plan view of a radiator element made according to my invention;

Fig. 6 is a sectional view of one modification thereof;

Fig. 7 is a similar view of another modification;

Fig. 8 is a diagrammatic view illustrating the method of forming the thin metallic strips into radiator elements;

Fig. 9 is a view illustrating another step in the method of manufacturing the elements;

Fig. 10 illustrates more or less diagrammatically a series of steps in securing the mating parts of the elements together.

Fig. 11 is a diagrammatic view illustrating further progress in the forming of the element;

Fig. 12 is a diagrammatic view illustrating the method of building up a radiator system with the individual elements of one modification;

Fig. 13 is a view illustrating the method of building up the radiator system of another modification;

Fig. 14 is a cross section along the line 14—14 of Fig. 5;

Fig. 15 is a diagrammatic view illustrating the circulating system;

Fig. 16 is an assembly sectional view illustrating a modified form of radiator element;

Fig. 17 is a plan view of such element;

Fig. 18 is a section on the line 18—18 of Fig. 17;

Fig. 19 is a section on the line 19—19 of Fig. 18;

Fig. 20 is a sectional view of an element showing method of attachment of and closing chamber; and Figs. 21 and 22 illustrate the automatic control of the circulatory passages.

Referring to the drawings where like numerals designate similar parts throughout I have illustrated my invention as incorported in an aeroplane of the monoplane type whose right and left wings are designated by the numerals 90 and 91. The motor for driving the craft is designated by the numeral 92 and is of the conventional V type. Both the upper and lower surfaces of the wing include a plurality of transversely disposed corrugated radiating elements 93 and in the particular embodiment herein exhibited these elements extend substantially all the way across the fixed part of the aerofoil surface, although obviously not limited thereto. These elements 93 are independently assembleable and disassembleable and are assembled closely adjacent each other in the direction of wing span as indicated in Figs. 1ª and 12. They are provided with side flat edges 94 which overlap each other along the cap strips of the wing and are securely fastened thereto by suitable fastening means passing through the openings 95. The forward and rear ends are also provided with flat edges 96, the forward edges 96 being fastened to the nose strips and the rear edge being fastened to a part of the wing structure such as a false beam. Each element 93 is formed of a pair of mating corrugated metallic strips to form the attenuated circulating passages in the fore and aft direction as hereinafter set forth more in detail.

Figs. 1 and 2 illustrate more or less diagrammatically certain further features of my invention and particularly the method of applying separate sheet like radiators of flexible character individually to both the upper and lower sides of the wing frame to form radiator lifting surfaces as substantially integral parts thereof, the combined structure being of the strength and possessing to a degree the flexibility desired in aeroplane wings, and with the tendency to breakage and leakage of the radiator reduced to a minimum. In Fig. 1 I have indicated diagrammatically a wing framework 1 of any desired type which is constructed and arranged to have incorporated therewith and as a part thereof, wing surface radiators forming the lifting surface on either or both the upper and lower parts of the wing. The upper and lower curvatures of the wing frame in the fore and aft direction are indicated conventionally at 2 and 3 respectively, namely, the surface radiator elements when incorporated in and correlated with the wing frame form the lifting surface of the wing along the curves 2 and 3. 4 and 5 indicate more or less diagrammatically the radiator elements which are to form the lifting surfaces along the curves 2 and 3 of the wing. These elements, as indicated, approximate the width of the wing in the fore and aft directions so as to form substantially the whole lifting surface in this direction. These radiators 4 and 5 are of a flexible sheet like construction to conform readily to the character of the wing curvature and are preferably formed of mating and interfitting corrugated thin metal sheets, the mating corrugations being sealed together to form a multiplicity of attenuated circulatory passages in the fore and aft direction of the wing. The elements 4 and 5, being constructed in this manner and of this material to form sheet like covers for the wings, have a flexibility and adaptability which enable them to be accurately fitted to and firmly incorporated into the wing to form a lifting surface for the wing which for all practical purposes forms a substantially integral part thereof. Inaccuracies or irregularities in the curvatures 2 and 3 of the wing frame work 1 or in the dimensions of the elements 4 and 5 do not impair the integrity of the combined structure, since the elements 4 and 5 and the wing frame work 1 may be assembled and fitted together with the accuracy and firmness desired in aeronautical practice. The facility and readiness with which the combined unit may be produced is pronounced, and moreover repairs may be effected by merely removing or operating upon the impaired part without the necessity of dismounting the wing or its lifting surface as a whole. In carrying out my invention I provide water manifolds 6 and 7 which are suitably arranged with reference to the frame work 1, as for example adjacent thereto or therewithin, these manifolds 6 and 7 leading to the engine to be cooled. After the frame work 1 is formed with the manifolds 6 and 7 adjacent to or, if desired, disposed therein, the elements 4 and 5 are then incorporated respectively on the upper and lower parts of the wing frame to form the lifting surfaces thereof and these elements 4 and 5 are provided with suitable connections 8 and 9 at their forward edges which are adapted to be connected respectively with the manifolds 6 and 7 to provide an inlet and outlet for the circulating cooling fluid. At their rear or trailing edges the elements 4 and 5 are provided with connections 10 and 11 respectively which are adapted to be connected together to form a circulatory passage from the element 4 to the element 5. A suitable coupling 12 for the connections 10 and 11 is indicated in Fig. 2 and similar couplings 13 located adjacent the nose of the wing for coupling the connection 8 with the manifold 7 and the connection 9 with the manifold 6. 14 indicates an aileron which may be readily attached to the trailing edge of the main wing frame. Fig. 2 indicates the combined wing and radiator lifting surface assembled in operative form. Aside from the facility and readiness with which the elements 4 and 5 of the general character indicated may be incorporated into the wing, without impairing either the wing structure or the radiator elements to form an accurately fitting integral part thereof, it is observed that the aileron 14 may be readily assembled or disassembled without impairing or interfering with either of the wing lifting elements 4 or 5, and the latter may be incorporated without fouling or being fouled by the aileron. The radiator elements 4 and 5 are preferably formed of mating corrugated sheets whose corrugations are of unequal depth, with the corrugations of greater depth having substantially vertical radiating walls as described below, but it is to be understood that the invention described above is not limited to any particular depth or manner of forming the corrugations or to any particular construction of radiator element except as is specifically set forth in the claims thereto.

In Figs. 3 and 4 I have illustrated a slightly modified arrangement of the combined wing and radiator lifting surface structure, the method, however, of building up and assembling being identical with the method and manner indicated in Figs. 1 and 2. A different type of wing frame is indicated an instead of having both the distributing manifolds at or adjacent to the nose of the wing, there is a single manifold 15 in the nose of the wing and another manifold 16 adjacent the trailing edge of the wing frame, the leading edges of the radiator elements 4' and 5' being both connected with the manifold 15 through the connections 8' and 9' and the trailing edges being both connected with the manifold 16 through the connections 10' and 11'. The invention, as described above, consists generally of building the wing frame work 1', mounting the manifolds 15 and 16 adjacent to or if desired therewithin, building the slightly flexible and adaptable sheet like elements 4' and 5' to form the upper and lower lifting surfaces respectively of the wing, mounting them on the wing, and forming the desired connections with the manifolds 15 and 16 which lead to the engine to be cooled. The complete assembly is indicated in Fig. 4, the aileron being omitted for convenience in illustration. The forming of separate sheet like radiators of flexible character (particularly flexible in the fore and aft direction) and applying them separately and individually to the under and upper sides of the wing frame as described above, result in a highly efficient combined structure, functioning in the manner desired with a minimum of breakages and leakages.

I have indicated in Fig. 5 a plan view of a radiator element of a construction and design adapting it to be readily positioned upon and under an aerofoil to form both the lifting surface and the radiator for the craft. These units are preferably of just sufficient length to bridge the width of the wing and are preferably quite narrow, enabling a large number of them to be assembled on the aerofoil surface to form a combined radiating system. To the left of Fig. 5 the numeral 21 indicates a radiator element made according to my invention, and to the right of Fig. 5 the numeral 22 indicates a slightly modified form. Each radiator unit is composed of a channeled or steeply grooved strip 23 and a mating corrugated strip 24, both preferably of thin metal such as brass. These two strips are brought together as indicated in Figs. 6 and 7 to form the circulating channels 25, these circulating channels 25 being of substantially small depth compared to their height and having comparatively steep or substantially vertical walls 26. The strips 23 and 24 are formed and assembled together to form the radiator unit in a manner to be hereinafter described. Each unit has at either end a distributing or collecting chamber. In one modification, Fig. 14, this chamber 27 is formed by expanding one end of the corrugated plate 24 to form the distributing chamber and from each of these chambers there is a connection 28 for supplying water to and taking it away from these respective chambers 27, these chambers being in free communication with the circulating channels 25. In the modification illustrated in Fig. 7 the distributing chamber is in the nature of a conical member 29 which is suitably secured to the plate 24 across either end thereof, the interior of this conical chamber 27 communicating with the channels 25 through the line of openings 30 formed transversely of either end of the strip 24.

The metal of which the strips 23 and 24 are formed is preferably of comparatively thin character and in forming the longitudinal channels 25 with their steep walls 26 it is important that the metal should neither be impaired nor stretched to avoid any premature fault or leak. It is also important to have the channels 25 as high as possible in comparison to their depth in a horizontal direction in order to obtain the maximum radiating service and to enable the height of these channels assisted by the thinness of the metal of which they are made to contribute towards easy flattening of the walls 26 against the base plate 24, as for example upon impact of a bullet, and thereby tending to seal the unit against leakage. To these ends I have indicated diagrammatically in Fig. 8 the method which I have used to great advantage in making these radiators with the deep channels 25. Upon a table 31 is mounted an elongated female die member 32 corresponding in width to the width of the aggregate channels and in length to the length of the radiator units and this die member 32 has a plurality of channels corresponding in number and dimensions to the number of channels 25 in the strip 23. Cooperating with this female die member 32 there are two male dies 33 and 34, these dies corresponding in length to the channels 25 and cooperating with the channels of the die member 32 to form the blank A into the channel strip 23. The arrangement is such that the male die 34 operates in advance of the die member 33 so as to enter the channel 25 last formed in the blank A and hold the strip firmly upon the die 32 to avoid the deformation of the channels previously formed while the die member 33 is advancing to form the next succeeding channel. The figure indicates the position with the die 34 already advanced and holding the die in position and the die 33 just beginning its downward movement to form the next succeeding channel. It is observed that the metal of the blank A flows freely in the direction of the arrow thereabove during the formation of each of the channels by the die member 33, and that the die 34 serves the double purpose of preventing deformation of the previously formed channels and also preventing the flow of metal in the reverse direction during the formation of the channels. By this method the radiator element 23 with channels of very great height compared to their depth in a horizontal direction may be obtained without either stretching or impairing the metal and without distorting or impairing the channels previously formed. Preferably in the receding movement the die 33 operates slightly in advance of the operation of the die 34 and after both dies 33 and 34 are caused to recede and clear the die 32 with the blank A thereon, the die 32 with its blank may be advanced forwardly as indicated by the arrow a distance equal to the width or depth (in a horizontal direction) of the channels to be formed, whereupon the previous operation of the dies 33 and 34 takes place to form the next channel. The strip 24 may be grooved in a similar manner to the formation of the strip 23. These channeled strips 23 and 24 have marginal edges 23' and 24' as indicated in Fig. 9 and before the two strips are mated together they are tinned on their abutting surfaces according to any of the usual methods, it being observed that in the particular instance illustrated, the whole upper surface of the channel plate 24 is tinned as indicated at 35, while only the lower bends of the walls 26 of plate 23 are tinned as at 36. After the two strips 23 and 24 are thus formed and tinned, they are mated together as indicated in Figs. 9 and 10 and their marginal edges sealed as indicated. The marginal edge 23' is indicated as being wider than the corresponding marginal edge 24' of the corrugated strip 24, and Fig. 10 illustrates on an enlarged scale five different operations which may be performed singly or otherwise in mating and sealing the marginal edges together:—position No. 1 showing the plates initially brought and mated together, position No. 2, both abutting marginal edges 23' and 24', turned upwardly at right angles to the plate, position No. 3, both edges turned again horizontally, position No. 4, where the overhanging edge of 23' has been turned downwardly and under to form a horizontal U bend around the marginal edge 24', and position No. 5, both turned down again to form an interlocking U seal or joint as indicated, the marginal edge or joint being indicated by the numeral 37.

With the unit thus formed with its elements 23 and 24 mechanically joined and mated together, it is then subjected to a treatment to thoroughly seal the marginal edges and the channels 25. This is effected according to the manner indicated diagrammatically in Fig. 11 showing an apparatus comprising a pair of rolls 40 and 41 which are adapted to be driven as for example by a crank 42, the rolls being yieldingly pressed together and adapted to receive therebetween the radiator unit indicated in position No. 5 of Fig. 10. Just in advance of the rolls 40 and 41 are positioned suitable heating devices 43 for heating the unit and melting the tinned surfaces 35 and 36. These heating devices may consist of a number of blow pipes adapted to project flames against both the elements 23 and 24 of the unit just before they reach the squeezing rolls 40 and 41. To the rear of the squeezing rolls 40 and 41 is disposed a cooling tank 44 containing a cooling fluid such as water and rotating in this water is another roll 45 over which the unit 21—22 passes on its exit from the squeezing rolls 40 and 41, and is cooled thereby. This cooling operating causes the tinned surfaces to set and freeze together as the unit 21—22 passes away from the squeezing rolls 40 and 41. In order to maintain the unit 22 in contact with the cooling roll 45 as indicated, an upper roll 46 which is movable up and down in a vertical direction and engages the upper surface of the unit 22 is provided. The means for holding the roll 46 tightly against the upper surface of the unit consists of a lever 47 which is pivoted on the axis of the roll 46 as a fulcrum and carries a free roll 48 on its lower end in engagement with the under surface of the unit 21—22 with a weight or equivalent means 49 resting upon the upper and free end of the lever 47. This arrangement serves the double purpose of yieldingly pressing the roll 46 downwardly and holding the unit tightly against the cooler roll 45 and also of applying pressure to the under side of the unit at a point between the squeezing rolls and the roll 46 to cause a slight bending of the unit 21—22 in the upper direction at this point, which causes the two elements 23 and 24 to be held tightly together until they have passed the cooler roll 45 to become thoroughly cooled and set thereby. The squeezing roll 40 is preferably formed with grooves corresponding in number to the channels 25 of the unit and the roll 41 may be either grooved or flat—preferably flat. The rolls 45 nnd 46 are preferably flat, although they may be grooved if desired. The unit thus formed is indicated in Figs. 5, 6 and 7 and is ready for attaching the water connections thereto. 45 indicates a yeilding means generally such as springs for yieldingly pressing the roll 40 against the cooperating squeezing roll 41.

Referring to Fig. 12, the radiator units may be assembled either on the upper or under surface of the aerofoil or upon both, as indicated in this figure. These units are brought close together and are connected to tapered distributing headers 51 and 52, carried within the wing or aerofoil structure. These headers are connected respectively with the upper and lower sets of individual units through means of the connections 28 as indicated. At their other end these units may be connected with each other, each upper and corresponding lower unit making a pair connected together by suitable connections (not illustrated). The engine to be cooled is indicated at 53 and the water circulating pump at 54, the latter having connections leading to the other bank of cylinders and to the wing or aerofoil on the other side. Fig. 13 shows generally the connections for the radiator unit 22 of Fig. 5. Here a distributing header 56 of tapered form is carried near the leading edge of the wing or aerofoil and is connected to the various units 22 through the medium of elbow connections 55, the latter leading to the connections 29 shown in Fig. 7. According to this modification there is a single tapered header 56 for the leading edge of the aerofoil and a similar tapered header (Fig. 15) for the trailing edge—each of these headers being connected, through connections of the general character indicated, with both the upper and lower sets of radiator units. Fig. 15 shows a circulating system for biplanes with radiator units on both wings, the radiator units 22 being omitted for convenience in illustration. The engine is located at 58, the circulating pump at 59 and a combined surge and reservoir tank at 60. The connection from the tank 60 to the pump 59 leads through an oil cooler 61 for cooling the oil used in the engine and the other side of the pump leads to the engine jackets, and from thence to the leading headers 56 of both the upper and lower wings of the machine. The rear headers 56 are connected with the rear end of the surge tank 60.

If desired, the connections, such as 28 and 56, may be provided with valves for isolating individual radiator units, in case of injury thereto or for other reasons.

I have found that a radiating system of this character is very efficient, the number and capacity of units being readily varied to suit the particular requirements of the motor which is to be cooled. The radiator sections are particularly efficient due to the fact that the water is evenly distributed in a multiplicity of attenuated streams in the channels, approximating a thin sheet or film throughout a substantial portion of the wing surface at every point of which the cooling air has direct and unimpeded contact therewith. Moreover, this efficiency in cooling off the engine is not obtained at the expense of increased parasitic resistance, the resistance of the combined radiator and wing being substantially no greater than the resistance of the wing of the same construction with the radiator elements omitted. The provision of the multiplicity of separate and distinct radiators units also renders possible a quick, economical repair when one section becomes broken or impaired, it being necessary to replenish or repair only the section or particular sections which are injured and which may be replaced with facility. Moreover, any one or pair of units may be readily isolated and disconnected from the system in case of leakage therein without interfering with the remainder of the system, as for example, by sealing the connections between them. The particular construction of the units themselves, including the inter-locking corrugations and the distributing chambers, together with the tapering elongated distributing manifolds, facilitate the distribution and formation of the flowing water in an approximate sheet or film-like body throughout the surfaces of the wings. With a given capacity of the motor and the required number and capacity of radiator units, the speed and efficient operation of the craft, together with greater safety, are substantially enhanced as compared with aircraft embodying prior radiating systems. By reason of the particular construction of radiator unit, a self-sealing function in case of puncture by bullet is obtained, the blow of the bullet tending to flatten out the thin walls (.005") of channels of the brass sheet on passing therethrough, the thin unreinforced walls of the vertical channels particularly tending to flatten against the reinforced base of the unit.

The radiator system thus obtained is particularly effective and efficient due to the large radiating surface of the multiplicity of attenuated channels 25, and the construction and assembly thereof whereby more units may be readily added to suit the requirements of the power plant, or assembled units may be isolated or entirely removed, as in the case of injury thereto, give to the system a flexibility not possessed by any prior system with which I am familiar. The radiator units themselves are of rugged construction in spite of the thinness of the metal of which they are made, the plate 24 being firmly sweated to the upper plate 23 throughout its length and serving as a reinforcing base plate for the unit. In addition to the large radiating surface of the channels 25, their height and the thinness of their walls also render them easily flattened out by impact of bullets in warfare, tending to secure a self sealing function, or at least minimize the leak caused thereby. Moreover, the metal of the grooved plates is not stretched or otherwise impaired during the process of manufacture, but, on the contrary, retains its original strength though of thin character.

Referring to Figs. 16–20 inclusive, I have illustrated more or less diagrammatically a slightly modified form of combined wing and surface radiator unit. In this construction, the radiator element 70, instead of having the attenuated passages 71 between the mating corrugations of the corrugated sheets sealed at their ends, have a V-shaped member 72 sealed to the upper and lower surfaces of these corrugations and forming a common chamber at either end communicating with these attenuated circulatory passages. These members 72 may be soldered, brazed, welded or secured in any other manner to form an airtight seal and chamber at the ends of the elements 70. Each of the elements 70 has an intake connection 73 forming a communication on one side with one-half of the attenuated passages 71, and an outlet connection 74 formed in a similar manner with the remaining circulatory passages, and these connections 73 and 74 may be disposed at any convenient point of the wing structure but preferably at some such point as indicated, for example, near the middle thereof in the fore and aft direction where the wing is of greater depth and it is therefore easier to accommodate and make the necessary connections to the distributing manifolds or headers. In the embodiment illustrated, the connections 73 and 74 lead respectively to manifolds 75 and 76, these manifolds being mounted within the wing structure in any suitable manner and leading to an engine to be cooled. In Fig. 19 is indicated a method of sealing the connections to the manifolds. The connections 73 are provided with ears 73' or equivalent devices with openings for the reception of securing screws 77, the latter being adapted to be screwed home into suitable screw-thread openings in the manifold 75 and to clamp the manifolds tightly against the connections with a compressible sealing gland 78 as of rubber therebetween to insure a tight seal. The lower radiator elements of the wing are connected to manifolds 75' and 76' in a manner similar to the connection of the upper elements to the manifolds 75 and 76. It is observed that the cooling water or other cooling fluid flows from a manifold through one of the connections into the radiator element and there divides,—a part of it flowing in one direction and a part flowing in the opposite direction to the chambers 72 at the ends of the elements. From there the water returns through the other half of the circulatory passages 71 to meet at the other connection to enter the other manifold. The elements 70 are formed of the corrugated thin metallic plates in the manner above set forth in connection with figures.

In Figs. 21 and 22 I have illustrated automatic means for closing off and isolating an impaired circulatory passage, as for example if the self sealing tendency of the steep walls forming the circulatory passages should fail to close the rupture entirely upon the passage therethrough of a bullet, I have devised supplementary means for closing the ruptured passage. The particular embodiment herein shown consists of automatically controlled valves 80 which are adapted to function to close the circulatory passage 81 and isolate it from the circulatory system whenever a leak occurs therein, these valves being adapted to be jammed up against or into the ends 82 of the passage when the leak occurs. As one means for effecting the automatic control of the valves I have indicated a small wire 83 connected between the valves at the opposite ends of a passage which upon being pulled or distorted out of its normally straight position brings the valves into operative closing position. The distortion of the metal in the vicinity of the wire, as for example when a bullet passes therethrough, exerts sufficient pull to close the valves, and the bullet itself, if it passes directly through the passage, may be relied on to jerk or pull the string sufficiently to close them. The valves may be of rubber or any other desired material.

Having thus described my invention, what I claim and desire to protect by Letters Patent is:

1. An aerofoil having a radiator forming the lifting surface thereof and having circulatory elements therein and means for automatically isolating one of said elements upon impairment thereof.

2. An aerofoil having a radiator forming the lifting surface thereof and having circulatory elements therein and means responsive to puncture of one of said elements for isolating it from the circuit.

3. An aerofoil having a radiator forming the lifting surface thereof and having circulatory elements therein and means responsive to passage of bullet therethrough for isolating the injured element.

4. An aeroplane wing having flexible metallic sheet-like radiator elements of substantially the fore and aft width of the wing individually and separately flexed and incorporated upon the top and bottom thereof as a lifting surface, said top and bottom elements being separately removable therefrom.

5. A wing of the character set forth in claim 4 wherein the radiator elements form a rigid part of the wing structure capable of flexing therewith during operation.

6. An aeroplane wing having a pair of flexible sheet like radiator elements of substantially the fore and aft width of the wing individually incorporated on the top and bottom thereof respectively as an aerofoil surface and means firmly securing said elements to the wing structure.

7. An aeroplane wing having a pair of flexible sheet like radiator elements of substantially the fore and aft width of the wing individually incorporated on the top and bottom thereof respectively as an aerofoil surface and means firmly securing said elements to the wing structure, but permitting each element to flex slightly with reference to the other.

8. An aeroplane wing structure including on each surface thereof a slightly flexible sheet like radiator element of substantially the fore and aft width of the wing and forming the aerofoil surface thereof and fastening devices passing through the wing frame work and firmly engaging the sheet like elements to flex and cause them to conform to the wing curvature.

9. A combined aeroplane wing and radiator structure including on each surface thereof a separate slightly flexible sheet like radiator element of substantially the fore and aft width of the wing and forming the lifting surface thereof and fastening devices firmly engaging said elements and holding them tightly flexed against the wing frame work and conforming to the wing curvature.

10. A combined aeroplane wing and radiator structure including on each surface thereof a separate sheet like radiator element of substantially the fore and aft width of the wing and forming the lifting surface thereof, each of said elements having sufficient flexibility to readily conform to the wing curvature but sufficient rigidity to hold their flexed form and form a substantially rigid aerofoil surface, and fastening devices firmly engaging said elements and holding them tightly flexed against and adhering to the wing frame work.

11. A combined aeroplane wing and radiator structure including on each surface thereof a separate sheet like radiator element of substantially the fore and aft width of the wing and forming the lifting surface thereof, each of said elements having sufficient flexibility to readily conform to the wing curvature and yield with the wing flexure but sufficient rigidity to hold their flexed form and form a substantially rigid aerofoil surface, and fastening devices passing transversely through the wing frame firmly engaging said elements and holding them tightly flexed against and adhering to the wing frame work.

12. An aeroplane wing structure of the character set forth in claim 10 wherein each radiator element is formed of corrugated mating sheets of metal with the interlocking corrugations forming a multiplicity of attenuated circulatory passages running in the fore and aft direction.

13. An aeroplane wing structure of the character set forth in claim 11 wherein each radiator element is formed of corrugated mating sheets of metal with the interlocking corrugations forming a multiplicity of attenuated circulatory passages running in the fore and aft direction.

14. An aeroplane wing structure of the character set forth in claim 10 wherein distributing manifolds are disposed between the upper and lower radiator elements and communicate therewith.

15. A combined aeroplane wing and radiator structure including a radiator element as the lifting surface thereof formed of a pair of separate sheets having interlocking corrugations to form a multiplicity of attenuated circulatory passages, the corrugations of each sheet being consecutively formed one by one, for the purpose set forth.

16. A combined aeroplane wing and radiator structure of the character set forth in claim 15 wherein the circulatory passages are formed by corrugations of different heights in the two sheets.

17. An aeroplane radiator comprising, in combination with an aerofoil, a removable radiator part adapted to provide a covering for a given portion of said aerofoil, a removable radiator part adapted to provide a covering for a different portion of said aerofoil, said radiator parts being separately removable and collectively defining a hollow radiator through the hollow of which a portion, at least, of said aerofoil is adapted to extend.

18. An aerofoil radiator comprising, in combination with an aerofoil, a removable radiator part adapted to be fitted in place by engagement with the under surface of the aerofoil, a removable radiator part adapted to be fitted in place by engagement with the top surface of said aerofoil, said radiator parts being separately removable and collectively defining a hollow radiator of substantially aerofoil form through the hollow of which a portion, at least, of said aerofoil is adapted to extend.

19. A combined aeroplane wing and radiator including a multiplicity of separate and distinct individually assembleable and disassembleable radiator units mounted closely adjacent to each other longitudinally of the wing to form a part of the lifting surface thereof.

20. A combined aeroplane wing and radiator including a multiplicity of separate and distinct individually assembleable and disassembleable radiator units extending transversely of the wing and mounted closely adjacent to each other longitudinally of the wing to form a part of the lifting surface thereof.

21. A combined aeroplane wing and radiator construction including a multiplicity of narrow individually assembleable and disassembleable radiator units extending transversely of the wing and assembled closely adjacent longitudinally of the wing to form the lifting surface thereof.

22. A combined aeroplane wing and radiator construction including a multiplicity of narrow individually assembleable and disassembleable radiator units extending transversely of the wing and assembled closely adjacent to each other longitudinally of the wing on both the upper and lower faces to form the lifting surface thereof.

23. An aeroplane wing of the character set forth in claim 20 including an elongated manifold extending longitudinally of the wing and having communicating connections with the radiator units.

24. An aeroplane wing of the character set forth in claim 22 having an elongated manifold disposed between the upper and lower sets of radiator units and extending longitudinally of the wing and having individual connections with one of said sets of radiators.

25. An aeroplane wing having a multiplicity of elongated flat radiator units extending transversely of the wing and individually assembleable and disassembleable closely adjacent to each other on both the upper and lower faces to form the lifting surface thereof, and a pair of elongated manifolds separate from said radiator units and disposed within the wing structure together with individual connections between the radiator units and the headers.

26. A combined aeroplane wing and radiator including a multiplicity of separate and distinct individually assembleable and disassembleable radiator units extending transversely of the wing and mounted closely adjacent each other longitudinally of the wing to form a part of the lifting surface thereof, and an elongated manifold extending within and longitudinally of the wing and having communicating connections with the radiator units, said elongated manifold being of tapered form to effect distribution of equal quantities of water between the manifold and its radiator units connected in multiple.

27. In an aircraft, the combination of a cylinder jacket, an aerofoil, a multiplicity of separate and distinct radiator units disposed on both the upper and lower sides of said aerofoil and forming the lifting surfaces therefor, said units being connected together at one end in pairs consisting of one upper section and one lower section, a pair of elongated manifolds disposed within said aerofoil and adjacent the other ends of the sections, said manifolds extending transversely of said radiator sections, one having communicating with the upper layer of radiator sections and the other having similar communicating connections with the lower of said layers, and a pump for circulating the cooling fluid from the cylinder jacket into one of said manifolds, causing it to enter one layer of said radiator sections and after passing therethrough to enter the other through the aforesaid end connections, and thence back to the other manifold and cylindrical jacket.

28. In an aircraft, the combination of a cylinder jacket, an aerofoil, a multiplicity of separate and distinct radiator units which are assembleable and disassembleable closely adjacent each other upon the aerofoil forming the lifting surface thereof, an elongated manifold separate from said units and disposed within said aerofoil and extending transversely of said radiator sections and having communicating connections therewith, and means for circulating a cooling fluid from the cylinder jacket into said elongated manifold and thence into said radiator units, the distributing manifold being gradually tapered from one end to the other according to the volume of water to be transmitted to the remaining radiator units therebeyond.

29. A combined aeroplane wing and radiator system including a plurality of elongated radiator units extending transversely of the wing and disposed on both the upper and lower faces thereof to form its lifting surface and a pair of tapered distributing manifolds carried within the wing structure, one at the trailing edge and one at the leading edge and both having individual connections with either of the upper and lower sets of radiator units.

30. A radiator unit for aerofoil surfaces comprising upper and lower inter-locking corrugated metallic strips sealed along their edges and formed with transverse expanded distributing chambers at one end to which the communicating connections lead.

31. A radiator unit adapted to be attached to and form a part of the lifting surface of an aerofoil consisting of a pair of closely disposed metallic strips having longitudinal inter-locking corrugations, the corrugations on one strip being deeper than the corrugations of the other, and both strips having comparatively flat borders, one bent over on the other, and the inner of said strips having expanded portions adjacent the ends thereof to form internal distributing chambers for the comparatively small circulating passages formed between the inter-locking corrugations.

In testimony whereof, I have signed my name to this specification.

ARTHUR L. THURSTON.

gated manifold and thence into said radiator units, the distributing manifold being gradually tapered from one end to the other according to the volume of water to be transmitted to the remaining radiator units therebeyond.

29. A combined aeroplane wing and radiator system including a plurality of elongated radiator units extending transversely of the wing and disposed on both the upper and lower faces thereof to form its lifting surface and a pair of tapered distributing manifolds carried within the wing structure, one at the trailing edge and one at the leading edge and both having individual connections with either of the upper and lower sets of radiator units.

30. A radiator unit for aerofoil surfaces comprising upper and lower inter-locking corrugated metallic strips sealed along their edges and formed with transverse expanded distributing chambers at one end to which the communicating connections lead.

31. A radiator unit adapted to be attached to and form a part of the lifting surface of an aerofoil consisting of a pair of closely disposed metallic strips having longitudinal inter-locking corrugations, the corrugations on one strip being deeper than the corrugations of the other, and both strips having comparatively flat borders, one bent over on the other, and the inner of said strips having expanded portions adjacent the ends thereof to form internal distributing chambers for the comparatively small circulating passages formed between the inter-locking corrugations.

In testimony whereof, I have signed my name to this specification.

ARTHUR L. THURSTON.

CERTIFICATE OF CORRECTION.

Patent No. 1,779,718.   Granted October 28, 1930, to

ARTHUR L. THURSTON.

It is hereby certified that error appears in the printed specification of the above numbered patent requiring correction as follows: Page 5, line 40, for the misspelled word "nnd" read and; page 8, line 108, claim 27, before the word "with" insert the word connections; and that the said Letters Patent should be read with these corrections therein that the same may conform to the record of the case in the Patent Office.

Signed and sealed this 9th day of December, A. D. 1930.

(Seal)

M. J. Moore,
Acting Commissioner of Patents.

CERTIFICATE OF CORRECTION.

Patent No. 1,779,718.                         Granted October 28, 1930, to

ARTHUR L. THURSTON.

It is hereby certified that error appears in the printed specification of the above numbered patent requiring correction as follows: Page 5, line 40, for the misspelled word "nnd" read and; page 8, line 108, claim 27, before the word "with" insert the word connections; and that the said Letters Patent should be read with these corrections therein that the same may conform to the record of the case in the Patent Office.

Signed and sealed this 9th day of December, A. D. 1930.

(Seal)                                                M. J. Moore,
Acting Commissioner of Patents.